US009920886B2

(12) United States Patent
Kusko et al.

(10) Patent No.: US 9,920,886 B2
(45) Date of Patent: *Mar. 20, 2018

(54) HYDROELECTRIC CONTROL VALVE FOR REMOTE LOCATIONS

(71) Applicants: David John Kusko, Houston, TX (US); Gabor Vecseri, Houston, TX (US); Daniel Maurice Lerner, Missouri City, TX (US)

(72) Inventors: David John Kusko, Houston, TX (US); Gabor Vecseri, Houston, TX (US); Daniel Maurice Lerner, Missouri City, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,792

(22) Filed: Jan. 17, 2017

(65) Prior Publication Data

US 2017/0152995 A1 Jun. 1, 2017

Related U.S. Application Data

(63) Continuation of application No. 14/110,325, filed as application No. PCT/US2011/000614 on Apr. 6, 2011, now Pat. No. 9,581,267.

(51) Int. Cl.
*F16K 31/12* (2006.01)
*F17D 5/06* (2006.01)
*F16K 31/124* (2006.01)

(52) U.S. Cl.
CPC ............ *F17D 5/06* (2013.01); *F16K 31/1245* (2013.01)

(58) Field of Classification Search
CPC .... F17D 5/06; F16K 31/1245; F16K 31/1635; Y10T 137/86485; Y10T 137/87096; Y10T 137/87265; Y10T 137/87306
See application file for complete search history.

(56) References Cited

U.S. PATENT DOCUMENTS

| 2,352,883 A | 7/1944 | Hassler |
| 3,790,124 A | 2/1974 | Ellet |
| 3,838,711 A | 10/1974 | Ellet |
| 3,958,217 A | 5/1976 | Spinnler |
| 4,348,058 A | 9/1982 | Coakley |

(Continued)

FOREIGN PATENT DOCUMENTS

| EP | 0681090 A2 | 11/1995 |
| EP | 0781422 B1 | 7/1997 |

(Continued)

*Primary Examiner* — Jessica Cahill
(74) *Attorney, Agent, or Firm* — ePatentManager.com; Guerry L. Grune (57) ABSTRACT

A hydroelectric control valve (HCV) for a fluid pipeline including an inlet and outlet section attached to a pipeline wherein fluid flows into and out of the HCV that comprises a bell section and a seat reservoir section which are both capped, where the bell section and the seat reservoir section are aligned with each other and are also perpendicular to fluid flowing through the pipeline. An electrical poppet channel is attached to the bell section, such that the bell section includes a bell relief channel in fluid communication with an outlet section and also a separate hydroelectric poppet channel in communication with a locating needle head as well as including a turbine and turbine channel where the turbine channel connects the input section and the seat reservoir and where the seat reservoir section includes a seat reservoir relief channel also in fluid communication with the output section.

1 Claim, 8 Drawing Sheets

(56) References Cited

U.S. PATENT DOCUMENTS

| | | |
|---|---|---|
| 4,379,543 A | 4/1983 | Reaves |
| 4,384,569 A | 5/1983 | Clearman |
| 4,391,152 A | 7/1983 | Ellet |
| 4,423,748 A | 1/1984 | Ellet |
| 4,589,493 A | 5/1986 | Kelly |
| 4,611,630 A | 9/1986 | Muchow |
| 4,676,140 A | 6/1987 | Haussler |
| 4,742,498 A | 5/1988 | Barron |
| 4,817,739 A | 4/1989 | Jeter |
| 4,825,421 A | 4/1989 | Jeter |
| 4,825,895 A | 5/1989 | Maltman |
| 4,830,122 A | 5/1989 | Walter |
| 4,834,222 A | 5/1989 | Kato |
| 4,848,473 A | 6/1989 | Lochte |
| 4,869,100 A | 9/1989 | Birdwell |
| 4,901,290 A | 2/1990 | Feld |
| 4,905,778 A | 3/1990 | Jurgens |
| 4,961,560 A | 10/1990 | Ellet |
| 5,009,272 A | 4/1991 | Walter |
| 5,040,155 A | 8/1991 | Feld |
| 5,070,900 A | 12/1991 | Johnson |
| 5,103,430 A | 4/1992 | Jeter |
| 5,117,398 A | 5/1992 | Jeter |
| 5,134,285 A | 7/1992 | Perry |
| 5,190,114 A | 3/1993 | Walter |
| 5,205,361 A | 4/1993 | Farley |
| 5,213,133 A | 5/1993 | Ellet |
| 5,215,113 A | 6/1993 | Terry |
| 5,250,806 A | 10/1993 | Reihn-Knudson |
| 5,291,918 A | 3/1994 | Johnson |
| 5,341,837 A | 8/1994 | Johnson |
| 5,395,090 A | 3/1995 | Rosaen |
| 5,402,068 A | 3/1995 | Meador |
| 5,438,170 A | 8/1995 | Klaveness |
| 5,461,230 A | 10/1995 | Winemiller |
| 5,464,040 A | 11/1995 | Johnson |
| 5,467,832 A | 11/1995 | Orban |
| 5,473,579 A | 12/1995 | Jeter |
| 5,508,975 A | 4/1996 | Walter |
| 5,517,464 A | 5/1996 | Lerner |
| 5,540,295 A | 7/1996 | Serrette |
| 5,626,016 A | 5/1997 | Walter |
| 5,802,011 A | 9/1998 | Winters |
| 5,804,820 A | 9/1998 | Evans |
| 5,836,353 A | 11/1998 | Steenwyk |
| 5,901,113 A | 5/1999 | Masak |
| 6,002,643 A | 12/1999 | Tchakarov |
| 6,016,288 A | 1/2000 | Frith |
| 6,053,261 A | 4/2000 | Walter |
| 6,057,784 A | 5/2000 | Scaaf |
| 6,082,473 A | 7/2000 | Dickey |
| 6,094,401 A | 7/2000 | Masak |
| 6,102,138 A | 8/2000 | Fincher |
| 6,220,371 B1 | 4/2001 | Sharma |
| 6,237,701 B1 | 5/2001 | Kolle |
| 6,276,135 B1 | 8/2001 | Ellet |
| 6,279,670 B1 | 8/2001 | Eddison |
| 6,300,624 B1 | 10/2001 | Yoo |
| 6,318,482 B1 | 11/2001 | Fidtje |
| 6,338,390 B1 | 1/2002 | Tibbetts |
| 6,439,316 B1 | 8/2002 | Penisson |
| 6,469,637 B1 | 10/2002 | Seyler |
| 6,481,689 B2 | 11/2002 | Grill |
| 6,481,896 B1 | 11/2002 | Grill |
| 6,508,317 B2 | 1/2003 | Eddison |
| 6,583,621 B2 | 6/2003 | Prammer |
| 6,588,518 B2 | 7/2003 | Eddison |
| 6,659,200 B1 | 12/2003 | Eppink |
| 6,668,948 B2 | 12/2003 | Buckman |
| 6,714,138 B1 | 3/2004 | Turner |
| 6,772,783 B2 | 8/2004 | Ethridge |
| 6,772,786 B2 | 8/2004 | Ellett |
| 6,840,337 B2 | 1/2005 | Terry |
| 6,898,150 B2 | 5/2005 | Hahn |
| 6,970,398 B2 | 11/2005 | Lavrut |
| 6,975,244 B2 | 12/2005 | Hahn |
| 6,997,272 B2 | 2/2006 | Eppink |
| 7,011,156 B2 | 3/2006 | Von Gynz-Rekowski |
| 7,032,689 B2 | 4/2006 | Goldman |
| 7,044,156 B2 | 5/2006 | Webster |
| 7,051,821 B2 | 5/2006 | Samuel |
| 7,100,708 B2 | 9/2006 | Koederitz |
| 7,145,834 B1 | 12/2006 | Jeter |
| 7,180,826 B2 | 2/2007 | Kusko |
| 7,319,638 B2 | 1/2008 | Innes |
| 7,673,705 B2 | 3/2010 | Gearheart |
| 2001/0054417 A1 | 12/2001 | Kato |
| 2002/0157871 A1 | 10/2002 | Tulloch |
| 2003/0196836 A1 | 10/2003 | Lasen |
| 2004/0089475 A1 | 5/2004 | Kruspe |
| 2004/0108138 A1 | 6/2004 | Cooper |
| 2004/0156265 A1 | 8/2004 | Lavrut |
| 2005/0070900 A1 | 3/2005 | Serhan et al. |
| 2005/0121235 A1 | 6/2005 | Larsen |
| 2005/0179263 A1 | 8/2005 | Johansen |
| 2006/0072374 A1 | 4/2006 | Kusko |
| 2006/0076163 A1 | 4/2006 | Terracina |
| 2007/0262665 A1 | 11/2007 | Park |
| 2008/0179093 A1 | 7/2008 | Kusko |
| 2008/0271923 A1 | 11/2008 | Kusko |
| 2009/0107723 A1 | 4/2009 | Kusko |
| 2009/0114396 A1 | 5/2009 | Kusko |
| 2009/0126798 A1 | 5/2009 | Mather |
| 2010/0147525 A1 | 6/2010 | Lerner |

FOREIGN PATENT DOCUMENTS

| | | |
|---|---|---|
| GB | 2157345 A | 10/1985 |
| GB | 2328459 A | 2/1999 |
| WO | 200057211 A1 | 9/2000 |
| WO | 2004044369 A2 | 5/2004 |
| WO | 2010071621 A1 | 6/2010 |

HYDROELECTRIC CONTROL VALVE FOR REMOTE LOCATIONS

PRIORITY

The following application is a continuation of and claims to U.S. application Ser. No. 14/110,325 filed Dec. 16, 2013 which is a 371 national phase application of and claims benefit to PCT application number PCT/US2011/000614 filed Apr. 6, 2011 entitled "Hydroelectric Control Valve for Remote Locations" and under 35 USC §120 of U.S. Non-Provisional patent application Ser. No. 13/080,724 filed Apr. 6, 2011 of the same title.

FIELD OF DISCLOSURE

Disclosed is a hydroelectric control valve (HCV) for fluid and gas systems that are flow and pressure responsive and is suitable for identifying and controlling, throttling or stopping the flow of gas or fluid. The present disclosure best serves the needs associated with remote and/or unmanned locations.

BACKGROUND OF DISCLOSURE

Pipeline transport is defined as the transportation of goods through a pipe. Most commonly, liquid and gases are sent through the pipeline(s), but pneumatic tubes that transport solid capsules using compressed air have also been used. As for gases and liquids, any chemically stable substance can be sent through a pipeline. Therefore sewage, slurry, water, or even alcoholic beverage pipelines exist; but arguably the most important in terms of value and commerce are those transporting fluid and natural gas.

Pipelines are generally the most economical way to transport large quantities of fluid or natural gas over land or via water and/or subsea. Compared to railroad, pipelines provide lower cost per unit and also higher capacity transport. Although pipelines can be built under the sea, that process is both economically and technically very demanding, so the majority of fluid transported at sea is by tanker ships.

Fluid pipelines are made from steel or plastic tubes with inner diameters ranging from roughly 30 to 120 cm (about 12 to 47 inches). Where possible, these pipelines are built and provided above water surfaces. However, in more developed, urban, environmentally sensitive or potentially dangerous areas, pipelines are buried underground at a typical depth of about 1.3-1.6 meters (about 3 feet). The fluid is kept in motion by a system of pump stations built along the pipeline and usually flows at speed of about 1 to 6 m/s" (excerpted from Wikipedia® "Pipeline Transport").

Today, more than 200,000 miles of fluid pipeline crisscross the continental United States as reported in the article; http://www.api.org/ehs/performance/transportation/moretransportation.cfm entitled, *More on Fluid and Natural Gas Transport*, Energy API, Aug. 31, 2006). Significantly more miles of pipeline exist worldwide.

In order to continue production, wellbores, pipelines, and control structures need to remain intact against threats or acts of sabotage, severe weather or fires. Acts of sabotage are so frequent that at least one publication in the fluid industry is dedicated to identifying each attack—see www.iags.org/iraqpipelinewatch.htm]. From June 2003 through May 28, 2007, the IAGS Energy Security newsletter (Jun. 1, 2007) listed 435 incidents of sabotage, ranging from rocket propelled grenades fired on fluid installations to finding pipeline security officers killed while on duty with no resultant damage to the pipelines. Even disused (non-producing wells) are the subject of attack and arson. These acts of sabotage are not just in Iraq, but throughout the world, and the list continues to grow.

Blastgard International reported in their Dec. 6, 2004 news release that "BlastGard's CEO Jim Gordon added "Between August and October, Iraq lost $7 billion dollars in potential revenue due to sabotage against the country's fluid infrastructure, according to Assem Jihad, spokesman of the Fluid Ministry. An estimated 20 fluid wells and pipelines were bombed or set ablaze this month in northern Iraq alone and Kirkuk pipelines and wells have been attacked at least 74 times since the collapse of Saddam's regime."—see—www.blastgardintl.com/press/pr 120606.asp "The pipeline industry and the petroleum industry have been conducting informational briefings on how pipeline systems function to ensure that government agencies and intelligence personnel understand the services provided, the potential risks and vulnerabilities, and what pipeline operators are doing to improve security"—see http://www.api.org/aboutfluidgas/sectors/pipeline/securitypreparedness.cfm, *Pipeline Security Preparedness*, Energy API, Sep. 30, 2006.

The clear message of the previous paragraphs shows the cost of damage to fluid pipelines in terms of manpower, production lost, and resulting cost to repair each area of damage. Additionally the weather has a significant impact on damage to fluid infrastructures and fluid production. In a report published in Pure Energy Systems News, dated Sep. 11, 2005 titled, *Update on Hurricane Katrina's Damage to the Gulf Fluid Patch*, by Paul Noel, the author states, "The reports officially are that something like 150 rigs are severely damaged though at least 500 have yet to be evaluated as of this time. 36 rigs are sunk and several are floating free, having broken moorings, etcetera". Adding, "The rigs are probably the best of the news. Financial sources say that the 33,000 miles of undersea pipelines may be in real trouble".

As recently as Jun. 29, 2007 the following report was carried on MSNBC.com., titled *Worst 3 months for U.S. in Iraq since war began*, Associated Press "In other developments, Iraqi police said a bomb exploded under an fluid pipeline south of Baghdad on Friday, spilling crude fluid and sparking a huge fire. The explosives were planted under a stretch of pipeline in the Mowehlah area of Haswa, a town 30 miles south of the Iraqi capital, a police officer said on condition of anonymity because he was not authorized to release the information. The pipeline transmits crude fluid from Iraq's southern fluid fields to the Dora refinery in Baghdad. The blast ignited a huge fire around 5 a.m., the officer said. By midday, firefighters were still struggling to extinguish the flames, which were fueled by a continuing leak of fluid from the pipeline, he said. Workers also were looking for a way to temporarily cut off the fluid flow, until a repair could be made, the officer added."

Therefore, there is a need for a hydroelectric control valve (HCV) for pipelines to selectively regulate, control and shut off the fluid flow in the pipelines if damaged or destroyed thereby saving desired fluids for production, minimizing fluid losses, eliminating hydrocarbons as a fuel source where there is fire and potentially saving many lives and reducing costs. Similarly, an HCV can be installed just below the surface of a wellbore with a radio receiver and encrypted coding in order that the HCV can be shut off remotely (including from the surface) in the event of terrorist attacks or any surface damage to Christmas tree valving. In petroleum and natural gas extraction, a Christmas tree, or "Tree", (not "Wellhead" as it is sometimes incorrectly referred to) is an assembly of valves, spools, and fittings, used for an oil well, gas well, water injection well, water disposal well, gas injection well, condensate well and other types of wells. The name is derived from the crude resemblance to a decorated tree.

RELEVANT ART

U.S. Pat. No. 4,379,543, to Reaves, V. Randon, and assigned to Valinco, Inc., describes a valve actuator comprising, a housing sealingly enclosing a vane connected to a valve via a shaft rotated by the vane. A means for moving the vane in the housing to a valve open position, a movable piston and return spring enclosed by a piston housing fixedly secured to the vane housing with the piston joined to an elongate rod wherein one end of the rod protrudes through an opening in the vane housing to contact the vane. The elongate rod includes a cylindrical cross-bar perpendicularly extending from the one end of the rod and the cross-bar providing a bearing surface for a bearing means to enable rolling contact with the vane.

U.S. Pat. No. 4,611,630, to Muchow, et. al., and assigned to Hydril Co., describes a apparatus for determining fluid flow rate comprising a choke valve, including a cylinder with an axial exit opening and a plurality of entrance side flow ports and a sleeve moving concentrically over the cylinder to determine the amount of entrance opening provided by the side flow ports. The sleeve includes a side keying means, a back-and-forth carrier operating with the sleeve side keying means for causing the sleeve to progress from opening to closing and back to opening of the side flow ports with the travel of the carrier. The carrier includes an eccentric drive keying means including a recess for accommodating the sleeve side keying means. The sleeve side keying means is a projection for riding in the recess in the carrier. A rotatable drive shaft at right angles to the cylinder and sleeve includes a compatible means for operating with the carrier drive keying means and power means connected for rotating the rotatable valve drive shaft, including a dynamic fluid actuator connected to receive actuation pulses from a single fluid input line, wherein a pulse input causes an incremental change in fluid flow through the choke valve.

U.S. Pat. No. 4,676,140, to Haussler, Hubert, and assigned to Beringer-Hydraulik GmbH, describes a hydroelectric control system for delivering a pressurized hydroelectric fluid to a user comprising, a pump means for supplying pressurized hydroelectric fluid to a fluid supply line, a user line operatively connected to the user, an adjustable throttle valve means connected between the fluid supply line and the user line for controlling the flow of the hydroelectric fluid from the pump means to the user. The pressure difference balance means includes a reference input line, a return flow line, and an output control line, for selectively connecting the reference input line or the return flow line to the output control line in response to the pressure difference in the fluid supply line and the user line. Additionally there is a control valve means disposed in the fluid supply line between the pump means and the throttle valve means and operatively connected to the output control line of the pressure difference balance means for selectively exhausting a portion of the fluid in the fluid supply line in response to the fluid pressure in the output control line.

U.S. Pat. No. 4,825,895, to Maltman, Michael, and assigned to Chevron Research Co., describes a valve for reducing the pressure of fluid consisting of a hollow, elongated cylindrical body having a horizontal axis; a cylindrical sliding sleeve member adapted to fit inside the body in a close-fitting relationship therewith. A sliding plug sleeve having an aperture along its longitudinal axis, the aperture has a restricted portion which converges then diverges in a gentle, sweeping fashion. The plug having a face that will substantially coincide with the restricted portion when the restricted portion is pressed against the plug and further comprising a first flow passage oriented to have its axis substantially parallel to the horizontal axis. The plug member is attached to the body at a first end with a sliding sleeve sealing means mounted on a second end of the body member. The sliding sleeve sealing means has a second flow passage therein and the body, the plug, and the sliding sleeve forming a first pressure control chamber. The body, the sliding sleeve sealing means, and the sliding sleeve form a second pressure control chamber and a means for selectively increasing and decreasing pressure in the first and the second pressure control chamber such that the restricted portion can be selectively moved along the horizontal axis and against the plug member to seal the first flow passage.

U.S. Pat. No. 4,830,122, to Walter, Bruno H., and assigned to Intech Fluid Tools, Ltd., describes a flow pulsing apparatus adapted to be connected in a drill string above a drill bit and including a housing providing a passage for a flow of drilling fluid toward the bit, turbine means in the housing rotated about an axis by the flow of drilling fluid, and valve means operated by the turbine means for periodically restricting the flow through the passage in a cyclical manner to create pulsations in the flow and a cyclical water hammer effect to vibrate the housing and the drill bit during use. The valve means including a valve member which is reciprocated in response to rotation of the turbine means to effect the periodic and cyclical restriction of the flow.

U.S. Pat. No. 4,834,222, to Kato, et. al., and assigned to Tokico, Ltd., describes a hydroelectric damper in which a fluid passage is defined through which fluid flows during extension and contraction strokes of the hydroelectric damper comprising, a valve mechanism disposed within the damper for generating a damping force during one of the strokes of the damper with the valve mechanism, including a main disc valve through which fluid in the damper flows during one of the strokes of the damper and a valve retaining means mounted in the damper for supporting the main disc valve in a first position. The main disc valve is allowed to be displaced in its entirety to a second position from the first position during the other of the strokes of the damper. The main disc valve is disposed across the fluid passage when it is in the first position and the fluid passage being in an open state, in which there is no resistance to the flow of fluid is offered by the main disc valve. When the main disc valve is in the second position, the main disc valve has an orifice defined therein and a disc adjacent the orifice at the downstream side thereof with respect to the direction in which the fluid flows there through during the one of the strokes of the damper. The disc is maintained in a closed position at which the disc closes the orifice and when no fluid is urged through the orifice, the disc of the main disc valve is deflectable from the closed position to an open position at which the disc opens the orifice under the pressure of the fluid flowing through the fluid passage during one of the strokes of the damper and while the speed at which one of the strokes occurs is below a predetermined value to generate the damping force.

U.S. Pat. No. 4,848,473, to Lochte, Glen E., and assigned to Chevron Research Co., describes an apparatus for a subsea well completion comprising, a wellhead connector having a tubing flow passageway in fluid communication with a well tubing and an annulus passageway in fluid communication with a well annulus. The tubing connection conduit has a first end operatively connected to the wellhead connector and in fluid communication with the tubing flow passageway and further comprising a tubing shut-off valve. An annulus connecting conduit has a first end operatively connected to the wellhead connector and in fluid communication with the annulus flow passageway and further comprising an annulus shut-off valve. An annulus wing conduit is connected to the annulus connecting conduit above the annulus shut-off valve and further comprising an annulus wing conduit shut-off valve, a treecap connected to a second end of the tubing connecting conduit and the annulus connection conduit with the treecap further comprising; a production stream conduit connected at a first end to the treecap and the tubing connection conduit; a pressure control valve connected to a second end of the production steam conduit; a production return conduit connected at a first end to the pressure control valve and at a second end to the treecap and a tubing wing conduit connected to the treecap and the production return conduit and further comprising a tubing wing conduit shut-off valve.

U.S. Pat. No. 5,070,900, to Johnson, Clarence W., and assigned to Bralorne Resources Ltd., describes a pressure monitoring system for a pipeline comprising a signal circuit having hydroelectric fluid at a first pressure, an actuator circuit having hydroelectric fluid at a second pressure, a pressure reducing valve between the actuator and the signal circuit, a pilot valve in operative relationship with the pipeline with the pilot valve being movable between a first position when the pressure in the pipeline is within predetermined operating limits and a second position when the pressure in the pipeline is outside of the operating limits and an accumulator to maintain the signal circuit at a substantially constant pressure in association with the pressure reducing valve, the hydroelectric fluid flowing between the signal and actuator circuits, the accumulator being operable to receive fluid from and discharge fluid to the signal circuit, the first pressure of the signal circuit being lower than the second pressure of the actuator circuit.

U.S. Pat. No. 5,205,361, to Farley, et. al., and assigned to Completion Systems, Inc., describes an improved traveling disc valve assembly for allowing increased production flow to the surface comprising, a length of tubing lowered down a cased wellbore, a crossover tool secured to the lower end of the length of tubing, a disc valve assembly secured to the crossover tool and positioned to a lower circulation position in the well bore. The assembly further comprises a disc valve secured in a bore of the assembly with a means interconnecting the crossover tool with the disc valve assembly and a means in the upper portion of the disc valve assembly for severing the disc valve assembly from the crossover tool when the disc valve assembly is moved to an upper position blocking production flow up the production string and means lowered into the bore of the production casing to rupture the disc valve and to disengage the disc valve assembly and push it to a position below the production screen to allow production to commence.

U.S. Pat. No. 5,213,133, to Ellett, James R., and assigned to Barber Industries Ltd., describes a pilot valve responsive to pressure changes comprising a base housing, an inlet in the base housing exposed to a pressure to be monitored, a diaphragm in the inlet within the base housing and a lower body operably connected to the base housing. There is a spool movable within a cavity in the lower body; inlet, exhaust and signal ports extending from the outside of the lower body to the cavity, annular grooves in the spool communicating with cross ports within the body and crossholes within the spool. A first spring biased poppet seal ring is mounted about the spool and being movable between a first position wherein the poppet seal ring contacts a first flange of the spool when the pressure is within normal operating pressure range and a second position out of contact with first flange of the spool and in contact with a first flange of the body when the pressure is one of either higher or lower than the normal operating pressure range by a predetermined amount.

U.S. Pat. No. 5,291,918, to Johnson, Clarence W., and assigned to Barber Industries Ltd., describes an actuator for opening and closing a valve comprising a manually operated pump for pumping hydroelectric fluid from a reservoir holding, the hydroelectric fluid to move a piston and a valve operated from the piston in a first direction and at least one spring to move the piston and the valve in a second direction opposed to the first direction and the spring being contained in the reservoir.

U.S. Pat. No. 5,341,837, to Johnson, Clarence W., and assigned to Barber Industries Ltd., describes a two-line pilot valve to operatively sense the pressure in a flowline comprising a body operable to be mounted to a base housing, a pushrod movable within the base housing and body, an inlet port and an outlet port, a first poppet sleeve mounted on the pushrod, a first poppet sleeve shoulder on the inside circumference of the first poppet sleeve operable to interact with a first pushrod flange on the outside circumference of the pushrod, a spring operable on the first poppet sleeve to urge the first poppet sleeve shoulder into a contacting relationship with the first pushrod flange. There is a first core ring mounted about the pushrod, a first o-ring mounted on the first core ring and being operable to simultaneously contact one end of the first poppet sleeve and the inside circumference of the body, an inlet port operable to admit fluid to a circumferential cavity surrounding the poppet sleeve and defined on one end by the first o-ring of the core ring and at the opposite end by a seal between the body and the first poppet sleeve. The outlet port communicates with the inlet port to exhaust fluid through the pilot valve when the first poppet sleeve is out of contact with the first o-ring of the first core ring.

U.S. Pat. No. 5,395,090, to Rosaen, Nils O., and unassigned, describes a valve between a position opening and a position closing fluid flow from an inlet through a chamber and to an outlet. The valve assembly including an inner cylindrical member coaxially mounted to an outer cylindrical member extending axially into an interior of the outer cylindrical member. The valve assembly further includes a valve member mounted between the inner cylindrical member and the outer cylindrical member. There is also a means for selectively moving the valve assembly between the opening and closing positions comprising utilizing pressure fluid at the inlet for moving the valve assembly to the opening position, spring means for moving the valve to the closing position and a means for balancing the effects of inlet pressure on the valve assembly as the valve assembly is moving to the closing position. The spring means includes a first spring biasing the inner cylindrical member and the outer cylindrical member toward the closing position, a stop means engaging the valve assembly to prevent further movement of the valve assembly by the first spring. The spring means further comprises a second relatively light spring biased between the outer cylindrical member and the valve member and operable, upon the inner and outer cylindrical members being prevented by the stop means from further movement by the first spring to urge the valve member to the closing position. A flexible seal means is carried by the valve member and engageable with the housing to prevent fluid flow from the inlet to the outlet when the valve assembly is in the closing position.

U.S. Pat. No. 5,464,040, to Johnson, Clarence W., and assigned to Barber Industries Ltd., describes a valve actuator apparatus comprising a piston movable within a housing and against the force of a spring within the housing, an indicator rod connected to the piston being adjustably mounted for relative axial movement relative to the piston and the spring. The spring and the piston remain stationary during the relative axial movement of the indicator rod relative to the piston.

U.S. Pat. No. 5,540,295, to Serrette, Billy J., and unassigned describes an earth boring apparatus using at least an upper section of drill pipe forming a drill string for boring geophysical holes to a desired depth comprising; an upright guide rail extending from a support base means for maintaining the apparatus at a selected location for boring the hole and securing the guide rail in a position above the location of the hole and substantially parallel to the drill string. A carriage means is movably coupled to the guide rail with a yoke assembly attached to the carriage for securing an upper end of the upper section of the drill string. The yoke assembly includes a plurality of vibrating means for generating in the yoke assembly cyclically recurring forces at selected frequencies substantially in the longitudinal direction of the drill string with the yoke assembly transmitting the recurring vibratory forces to the drill string and a main drilling means for providing a normal motive force that is substantially constant on the drill string to cause the drill string to penetrate in a boring manner through the earth until reaching the selected depth for the bore hole. The main drilling means acts directly only on the upper end of the upper section of the drill string, whereby the main drilling means is principally used to cause the drill string to bore the desired hole and when the drill string reaches an impenetrable subsurface layer, the frequency of the vibrators is increased to assist in the penetration of the drill string.

U.S. Pat. No. 6,276,135, to Ellett, James R., and assigned to Argus Machine Co. Ltd., describes a hydroelectric control circuit for a hydroelectric actuator comprising, a high-low pilot valve having a sensing port for connection to a flow line, a first line connecting the high-low pilot to a hydroelectric actuator, the first line forming a single pressure circuit, a second line connecting the high-low pilot to a reservoir, a normally closed relief valve connected to the first line for relief of excessive pressure, a normally closed override valve connected to the first line for manual override of circuit controls and a pump connected to the first line for pressuring the first line.

U.S. Pat. No. 6,772,783, to Etheridge, Reggie H., and unassigned, describes a valve for controlling a fluid flow, the fluid having a fluid pressure with the valve comprising, a valve housing being substantially tubular and comprising; a tubular wall defining a fluid flow path within the tubular wall. The valve housing defines an inlet for receiving the fluid into the fluid flow path and the valve housing defining an outlet through which the fluid exits from the fluid flow path of the valve housing. The valve housing defines a stem aperture within the tubular wall, a rotatable stem extending through the stem aperture with the rotatable stem having a stem axis of rotation and a stem drive element for the rotatable stem drive shaft. A closure element is slidably mounted for linear movement with respect to valve housing to thereby control the fluid flow through the valve and a plurality of interconnection members for interconnecting the rotatable shaft and the closure element where the plurality of interconnection members are slidably mounted to at least one of the stem drive element or the closure element.

U.S. Pat. No. 6,772,786, to Ellett, James R., and assigned to Argus Machine Co. Ltd., describes a hydroelectric control circuit comprising, a control line connected to a device to be controlled by fluid pressure in the control line, a time-out valve on the control line with the time-out valve having a time-out period during which time-out period operation of the time-out valve is delayed after actuation of the time-out valve and a pump connected to the control line for pressurizing the control line with fluid. An arming valve operated by pressure on an arming line is connected to the control line and the arming valve is connected to the time-out valve to reduce the time-out period in response to pressure on the control line.

SUMMARY OF THE DISCLOSURE

Disclosed is a device, method and system for a hydroelectric control valve (HCV) which is responsive to the flow and pressure of fluid within a pipeline which reacts to stop the flow of fluids. It is a device, method and system wherein the device has a pressure and flow sensing capability, which senses a change in the nominal inflow or pressure, activates the HCV to block the flow of fluid in a pipeline, and a fluid means for deactivating the HCV to resume normal flow.

An embodiment of this disclosure includes the fact that the HCV can be opened or closed remotely with minimal energy consumption by the activation control valves.

An embodiment of this disclosure includes an HCV device that is built into a fluid pipeline comprising four pipe sections in a cross pattern with an inlet section attached to a pipeline where the fluid flows from and into the HCV, an outlet section in line with the input section wherein fluid flows from the HCV, a bell reservoir section that is capped and a seat reservoir section that is capped that are in line with each other and perpendicular to the fluid flow of the pipeline. From the input section, there is an electrical activation channel attached to the bell reservoir section and a second hydraulic poppet channel in communications with a locating needle head. A deactivation channel connects the input section and the seat reservoir section. The bell reservoir section also has a bell relief channel in fluid communication with the outlet section. From the seat reservoir section there is a seat reservoir relief channel also in fluid communications with the outlet section.

An embodiment of the electrical activation channel includes a pressure sensor and/or a flow sensor that monitors pressure and/or flow to create a "signature" in a datastream of the fluid in the pipeline. The signature (or pressure or flowrate) is then transmitted to a computer for analysis, compared to other signatures, depending on the type of fluid that should be in the pipeline. If an anomalous signature is sensed, the computer causes the activation solenoid valve to fully open in the electrical activation channel so that the fluid moves forcefully into the bell reservoir section filling fluid into the needle base chamber and needle base and pushes the needle across and through the pipeline into the needle seat The fluid in the hydraulic poppet channel may be assisted by the addition of an inline pump. Maximum movement of the locating needle within the bell urges the bell to laterally move across the pipeline flow thereby controlling the flow of fluids within the pipeline.

Another embodiment includes the use of a hydroelectric pump which may be housed within the hydraulic poppet channel to aid in filling the bell flow chamber with fluid.

Another embodiment includes a fluid driven turbine propelled by the fluid flowing in the deactivation channel by rotating an internal turbine system coupled to an electrical generator thereby providing electrical power to internal sensors, transducers and battery(s) wherein the turbine is located in the deactivation channel between the inlet section and the seat reservoir for use in powering any or all of the devices located in any or all of the channels connecting the pipeline sections.

Another embodiment includes providing a possible need for nudginmg the needle base or the needle head to start the dual action piston motion within the either the bell reservoir section or the seat reservoir section. Using a manual or automatically driven worm gear device that can push the needle may be necessary and can be remotely controlled.

Another embodiment includes the use of a self cleaning screening mechanism which lies in the portholes that provide access entry into the electrical activation channel, hydraulic poppet channel, and activation channel. These self cleaning screensa are located on either side of the upper main pipeline and are utilized depending on the cleanliness of the fluid, gas, and/or environment.

Another embodiment includes an FTD located within the seat reservoir relief channel wherein when the bell is fully sealing the pipeline the FTD stops fluid from flowing in the seat reservoir relief channel and backing up into the seat reservoir where the pressure of the seat reservoir and the bell end reservoir reach a pressure stasis thereby maintaining the bell position within the pipeline without further pressure mechanical or hydroelectric influences.

An embodiment includes an HCV that may be used in a pipeline for transporting fluids or controlling fluid flow, such as, but not limited to; transporting fluid, gas, water, brine, slurry, sewage or beer.

Another embodiment includes an HCV incorporating a bell to shut off fluid flow in a pipeline wherein the bell does not have a locating needle or locating needle head to move laterally to urge the lateral movement of the bell across the pipeline wherein the movement of the bell is urged by hydraulic pressure of the fluid through a pump located in the hydraulic poppet channel.

Another embodiment includes an HCV that is inserted inline into a pipeline shaped with a perpendicular pipe section that contains a lever that is connected to a hydroelectric tube containing optionally a hydroelectric pump and a piston assembly. Also, mechanically connected to the piston assembly is a dual-faced piston that has a first chamber and a second chamber wherein the dual-faced piston has an input side and an output side depending on the direction of fluid flow and the piston has a first face and a second face residing between the end wall of the first chamber and the end wall of the second chamber. As a hydroelectric force is supplied to the first chamber side of the first face the piston moves away from the end wall of the first chamber toward the end wall of the second chamber, urging the linkage connected to the lever to move in a direction to actuate a gate or valve within the pipeline section thereby preventing the pipeline from a fluid flow. Inversely, as the pressure in the first chamber decreases the piston moves toward the end wall of the first chamber, thereby urging the mechanical linkage connected to the lever to move in a direction so as to cause the gate or valve within the pipeline to open thereby causing the fluid to flow in the pipeline.

Another embodiment includes an HCV that is a ball valve design that is actuated by hydroelectric actuated piston acting on a lever.

Another embodiment is an HCV piston assembly with two chambers that are a first chamber and a second chamber with a first chamber having an inflow channel and a relief channel, each with a valve, and a second chamber with an outflow channel and a relief channel, each with a valve.

Another embodiment includes an HCV ball valve design with a hydroelectric piston that acts bi-directionally on an actuating lever.

Another embodiment includes an HCV ball valve design within a pipeline wherein the ball valve is to prevent or permit a fluid flow via a hydroelectric piston attached to a linkage to a ball valve actuating lever. An isolator pressure assembly is connected to the pipeline fluid flow by an isolator input channel and a reservoir input channel that is attached to the pipeline. The isolator input channel has an isolator input channel valve in-line and attaches more specifically to a first isolator chamber within the isolator pressure assembly. The first isolator chamber has an isolator disk creating two sections within the first isolator chamber. The other side of the isolator disk is a second chamber that is filled with fluid or hydroelectric fluid such that when the first isolator chamber begins to fill, the isolator disk moves into the area of the second isolator chamber thereby forcing fluid out of the second isolator chamber and into a piston activator channel and thereby into an piston second chamber. The fluid in the piston second chamber pressure increases, thus moving a dual-faced piston in a direction within the piston assembly. A linkage attached to the dual-faced piston attaches on the other end to a lever on the ball valve wherein when the dual-faced piston moves due to the pressure of the fluid, the movement of the dual-faced piston translates into movement of the linkage thereby moving the lever of the ball valve to urge the ball valve to close.

Within the reservoir input channel is a reservoir input channel valve that is closed thereby preventing the flow of fluid into the reservoir pressure chamber. The reservoir pressure chamber has a reservoir disk within it creating a reservoir secondary chamber which is filled with fluid. The reservoir secondary chamber is attached to the piston primary chamber via a reservoir piston channel. As the fluid pressure in the piston second chamber thereby increases, thus moving a dual-faced piston in a direction decreasing the volume of the piston primary chamber, fluid is urged from the piston primary chamber into the reservoir piston channel and into the reservoir secondary chamber whereby the reservoir secondary chamber volume expands against the reservoir disk thereby decreasing the volume of the reservoir primary chamber causing fluid flow down the reservoir output channel past the open reservoir output channel valve and into the pipeline downstream of the ball valve.

In order to open the ball valve, fluid flow from the pipeline flows through the reservoir input channel and reservoir input channel valve and into the reservoir primary chamber. The isolator input channel valve is closed preventing fluid flow. As fluid flow increases in the reservoir primary chamber the reservoir disk moves toward the reservoir secondary chamber urging the fluid in the reservoir secondary chamber to move into the piston primary chamber via the reservoir piston channel. The increase in fluid in the piston primary chamber causes the dual-faced piston to move toward the piston second chamber thereby moving the fluid from the piston second chamber and into the piston activator channel. The fluid then flows into the second isolator chamber causing the isolator disk to move into the first isolator chamber, decreasing the volume of the first isolator chamber and urging the fluid flow out the isolator relief channel through the open isolator relief channel valve and into the fluid flow of the pipeline.

Another embodiment includes an HCV wherein the first isolator chamber and the reservoir primary chamber only contain fluid flow from the pipeline.

Another embodiment includes an HCV wherein the second isolator chamber and the reservoir secondary chamber only contain fluid or hydroelectric fluid.

Another embodiment includes HCV wherein the isolator disk and the reservoir disk form separate and isolated systems where the fluid or hydroelectric fluid of the dual-faced piston is separate from the fluid flowing in the pipeline.

Another embodiment includes an HCV wherein the isolator relief channel and/or the reservoir output channel has a turbine that is activated by fluid flow that is attached to an inductive fluid for generation of electrical power to be used for solenoids, instrumentation or batteries for storage of the electrical power generated.

Another embodiment includes an HCV wherein the isolator input channel and/or the reservoir input channel has a pump for moving fluid into the first isolator chamber or the reservoir primary chamber.

Another embodiment includes an HCV wherein the linkage attachment to the ball valve lever is a rack and pinion system to translate the linear motion of the piston into rotational motion to actuate the ball valve.

Another embodiment includes an HCV wherein the activation and/or deactivation of the valves are controlled by computer or operator.

Another embodiment includes an HCV that is a flow throttling device (FTD) place within a pipeline that is connected hydroelectrically to a valving assembly near the FTD but outside the pipeline. When a disruption in the flow of fluid in the pipeline causes the instrumentation to sense a high or low flow volume of pressure condition, a computer or an operator activates a series of valves to block or encourage fluid flow through the valving assembly and/or the pipeline. An input tube is connected on the upside of the fluid flowing within the pipeline and to the valving assembly through an upper input solenoid valve and a lower input solenoid valve. The fluid flowing in the pipeline provides a displacement volume for the valving assembly. When the upper input solenoid valve and/or lower input solenoid valve is activated and caused to be open, the fluid flows into the valving assembly creating a pressure in the valving assembly that is higher than the nominal fluid flow pressure thereby causing the fluid flow down a FTD link channel that is connected to the FTD actuator valve. The FTD actuator valve is then urged into the FTD actuator seat stopping the fluid flow in the pipeline. The upper output solenoid valve and/or the lower output solenoid valve remains closed wherein the fluid remains in the valving assembly. Closure of the upper input solenoid valve, lower input solenoid valve, upper output solenoid valve and the lower output solenoid valve keeps the pressure in the system in stasis wherein the FTD remains in the FTD actuator seat blocking the fluid flow in the pipeline.

When the upper output solenoid valve and/or the lower output solenoid valve is activated opening the valve, the fluid flows through the valving assembly to an output tube thereby releasing hydraulic pressure within the valving assembly, FTD link channel and FTD actuator valve allowing the FTD actuator valve to open and permit the flow of fluid within the pipeline.

Another embodiment includes a flow throttling device (FTD) that is placed linearly within a pipeline as an HCV for stopping and resuming the flow of fluids within a pipeline wherein the fluid flow causes the FTD to generate a signature data stream up hole to a computer and if the signature data stream should become varied the computer activates a series of solenoid valves to open or close thereby activating the FTD to stop or resume the flow of fluid in the pipeline.

In addition, the use of these designs can be extended to determining more information regarding the fluid/gas/water fluids within a lateral passage by measuring the magnitude of the pulses at distances remote from the downhole bore location. Sensors which may be placed at different locations in various lateral passages could be used to indicate pulse magnitude, travel distance and velocity during or in the absence fluid flow as required by the operation.

DETAILED DESCRIPTION OF THE DRAWINGS

Figure 1:
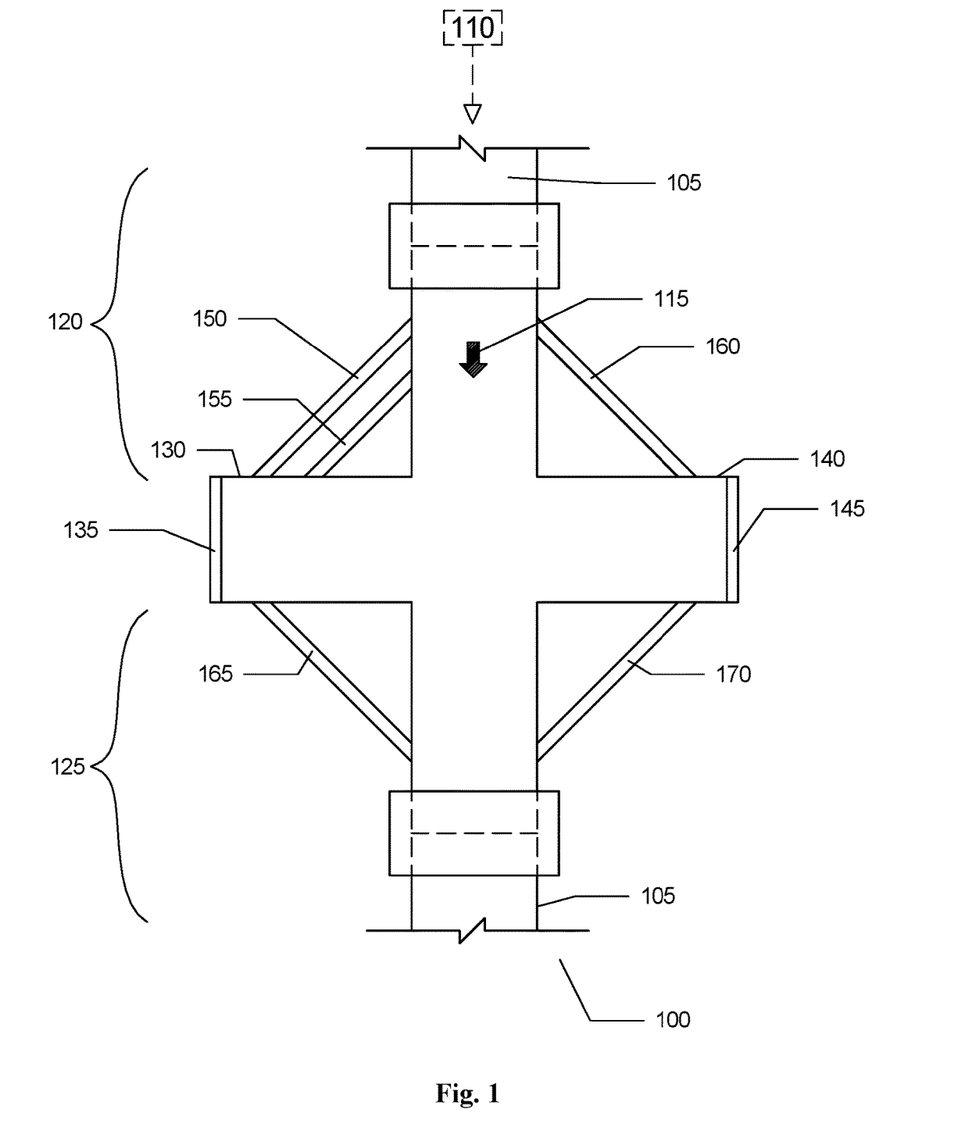
FIG. 1 is an overview of the hydroelectric control valve (HCV) and how it interconnects to a pipeline.

FIG. 1 is a top view of the hydroelectric control valve (HCV) [100] and its placement inline with a pipeline or main flow channel [105] used to transport fluid [110] and the direction of the pipeline fluid flow [115]. The HCV [100] is responsive to the flow and pressure of the fluid [110] in the pipeline. The HCV [100] responds to a change in pipeline fluid flow [115] and/or pressure to stop or at least limit the pipeline fluid flow [115] in the main pipeline or main flow channel [105]. Alternately, the HCV [100] can be opened or closed remotely with minimal energy consumption and allows for activation of the control valves [161] and [151] (shown FIG. 1A). The HCV [100] is constructed in a cross shape with an inlet section [120] that is upstream of the pipeline fluid flow [115] where the pipeline fluid flows [115] into the HCV [100]. Downstream from the input section [120] is an output section [125]. Perpendicular to the main pipeline [105], are; on the left side, the bell reservoir section [130] having a bell end cap [135], and on the right side is the seat reservoir section [140] which contains a seat reservoir end cap [145]. In actual use, the bell reservoir section [130] and the seat reservoir section [140] may be rotated axially around the centerline of the main pipeline [105] such that the main pipeline [105] and the input section [120] and output section [125] may be joined by any available means.

From the input section [120] in fluid communication to the bell reservoir section [130] is an electrical activation channel [150] and a hydraulic poppet channel [155]. Starting with the input section [120] in fluid communication to the seat reservoir section [140] is a deactivation channel [160]. Following the direction of fluid flow [115], from the bell reservoir section [130] in fluid communication to the output section [125] is a bell relief channel [165] and from the seat reservoir section [140] in fluid communication to the output section [125] is a seat reservoir relief channel [170].

Figure 1A:
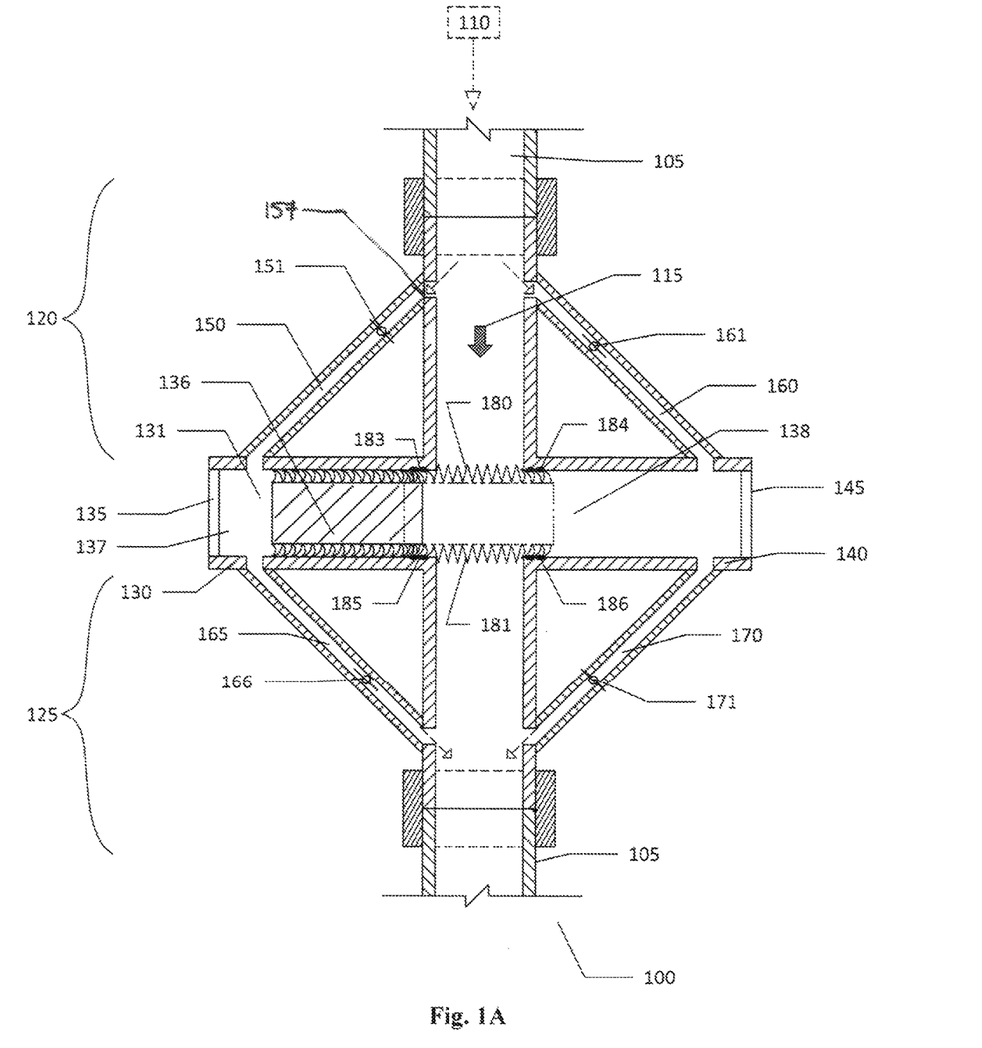
FIG. 1A is a cross sectional version of FIG. 1 showing a 2-way HCV.

FIG. 1A is a cross sectional version of a 2-way HCV [100] comprising a main flow channel or main pipeline [105] and four control channels, electrical activation channel [150], activation channel [160], bell relief channel [165], and seat reservoir relief channel [170], and a valve travel channel [131] through which the dual acting piston (DAP) [136] that includes two ends namely, the open valve piston end [137] and a closed valve piston end [138] that travels within the valve travel channel [131]. In the valve open position at time T0, the DAP [136] does not block pipeline fluid flow [115] through the main flow channel [105] such that the DAP [136] is located on the left side of the main pipeline [105]. At time T1, the control valve [166] and activation control valve [161] are in the open position and simultaneously the other control valves, the activation control valve [151] and the control valve [171] are placed in the closed position.

At time T2, the activation control valve [151] and control valve [171] are in the open position and the control valve [166] and the activation control valve [161] are in the closed position then the DAP [136] traverses across the valve travel channel [131] due to the pressure increase that occurs within the bell reservoir section [130] caused by the flow of fluid through control channel [150] which causes pressure to be applied on the open valve piston end [137]. The DAP [136] traverses past the main flow channel [105] and blocks the fluid flow [115] through the main flow channel [105] such that the DAP [136] is now located on the right side of the valve travel channel [131]. At time T3, the DAP [136] comes to a stop in the main flow channel [105] thereby completely blocking the main flow channel [105]. Complete seating of the DAP [136] that is substantially leak free and accomplishes a complete seal and proper guidance of the DAP [136] within the valve travel channel [131] utilizes fins [180 and 181] attached to and extending above and below the exterior surface of the DAP [136] to ensure complete sealing, closure, and alignment of the DAP within the valve travel channel [131]. In addition to the sealing accomplished by the fins [180 and 181] four set of seals [183,184, 185, and 186] and are located on the valve travel channel body [131] on either side of the main flow channel [105] in order to prevent leakage into the piston area. This results in complete stoppage of the main fluid flow [115] through the main flow channel [105]. Once the DAP [136] has seated and shut off or reduced flow within the pipeline [105], the activation control valve [161] in the deactivation channel [160] remains closed and the control valve [171] in the seat reservoir relief channel [170] stays open.

In order to reopen the main flow channel [105] at time T4 using the DAP [136] the control valve [166] is opened to release the pressure applied on the open valve piston end [137] and activation control valve [151] and the control valve [171] are closed. The activation control valve [161] is simultaneously opened which results in a fluid pressure buildup in the seat reservoir section [140] which is then applied to the closed valve piston end [138] causing the dual acting piston [136] to move back across the valve travel channel [131] and allowing the main fluid flow [115] through the main flow channel [105] to resume unimpeded.

In operation, as the diameter of the control channels, electrical activation channel [150], activation channel [160], bell relief channel [165], and seat reservoir relief channel [170], is increased, the speed at which the valve opens and closes also increases. The amount of energy required to control the operation of this HCV [100] is minimal and unique in comparison with the manner in which control valves, pressures and fluid flowing through the pipeline is utilized. Due to the small amount of energy required to close any sized valve, this actuation system can be powered by rechargeable batteries (using solar, wind, wave, geothermal, hydraulic or any other available source of energy). The ability to have operational geographic independence of the HCV allows it to be used in essentially any remote environments including subsea-level, subterranean, within a wellbore, or anywhere that large power requirements are inconvenient for supplying power to open and close valves. Even in areas with convenient power availability, the HCV can be used as a back-up in the event of power losses where safety or security is necessary.

Figure 2:
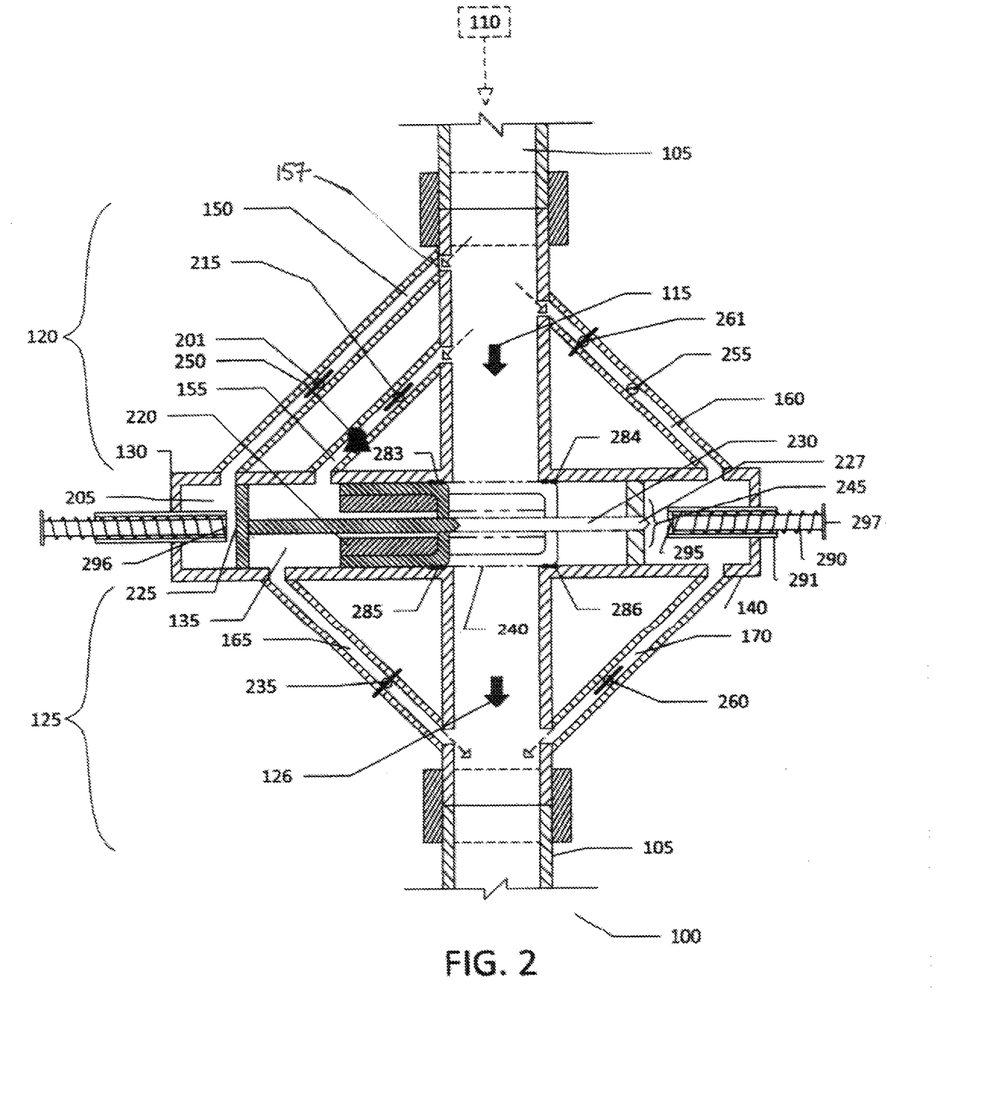
FIG. 2 is a sectional detail of FIG. 1 showing the HCV in a nominally open position with phantom lines showing the HCV in the closed position.

FIG. 2 is a sectional view of FIG. 1 showing the HCV [100] in a nominally open position with phantom lines showing the HCV [100] in the closed position. The HCV [100] can traverse to a closed position in the event of an open pipeline [105] due to destruction caused by sabotage, fire, natural disasters, or severe weather. In the electrical activation channel [150] or the main flow channel [105] is a pressure sensor and/or a flow sensor (not shown) that monitors pressure and/or flow to create a "signature" in a datastream of the fluid [110] in the pipeline [105]. The signature (or pressure or flowrate) is then transmitted to a computer (not shown) for analysis, compared to other signatures, depending on the type of fluid [110] that should be in the pipeline [105]. If an anomalous signature is sensed, the computer causes the activation solenoid valve [201] to fully open in the electrical activation channel [150] so that the fluid [110] moves forcefully into the bell reservoir section [130] filling fluid into the needle base chamber [205] and needle base [225] and pushes the needle [230] across the pipeline [105] into the needle seat [245]. Nearly simultaneously, in the hydraulic poppet channel [155] a bell solenoid valve [215] moves from a closed position to an open position allowing fluid [110] to forcefully flow into the bell flow chamber [206] which forces the bell housing [220] across the pipeline [105] and close the HCV [100]. The needle base [225] is in close relationship with the bell housing [220] forming a cylinder and piston configuration. As the fluid [110] flows into the needle base chamber [205] the needle [230] is urged toward the seat reservoir section [140] perpendicular to and across the pipeline [105]. At this point a bell reservoir section shutoff valve [235] residing in the bell relief channel [165] is closed thereby stopping fluid [110] from flowing in the bell relief channel [165] creating a backpressure in the bell reservoir section [130] urging the shutoff bell [240] to move toward the seat reservoir section [140]. The needle [230] urged by the hydraulic pressure from the bell housing [220] on the needle head [227] contacting and seating on the needle seat [245] located in the seat reservoir section [140]. As the needle [230] moves into the needle seat [245] the underside of the needle base [225] contacts the base of the shutoff bell [240] and bell housing [220] supplying additional force on the shutoff bell [240] and bell housing [220] to move across the pipeline [105]. When the needle [230] has fully traversed the needle seat

[245] the shutoff bell [240] has closed off the pipeline [105] from any fluid [110] flowing past the shutoff bell [240].

Optionally a hydroelectric pump [250] may used be within the hydraulic poppet channel [155] to aid in filling the bell flow chamber [206] with fluid [110].

If needed, a turbine generator [255] is located within the deactivation channel [160]. that generates electrical power for operation of instrumentation, operation of the bell reservoir section shutoff valve [235], the seat reservoir relief shutoff valve [260] located in the seat reservoir relief channel [170], and for battery energy (not shown) storage.

Once the needle [230] has seated and the shutoff bell [240] has closed off or reduced flow within the pipeline [105], the seat reservoir relief shutoff valve [260] closes thereby controlling fluid [110] from reaching the output section [125] downstream of the HCV [100]. The pressures are then equalized in the bell reservoir section [130] and the seat reservoir section [140] causing the shutoff bell [240] to remain in stasis.

Additionally, the shutoff bell [240] may not have a needle [230] as a guide to move into the seat reservoir section [140] wherein fluid [110] from both the electrical activation channel [150] and the hydraulic poppet channel [155] may both urge the shutoff bell [240] across the pipeline [105].

Opening the pipeline [105] to resume the flow of fluid [110] proceeds as follows: the bell reservoir section shutoff valve [235] and the deactivation solenoid valve [261] are opened allowing fluid to flow into the output section [125] thereby decreasing the pressure of the fluid [110] in the needle base chamber [205] and bell flow chamber [206] allowing the shutoff bell [240] to move into the bell reservoir section [130]. In addition, the seat reservoir relief shutoff valve [260] remains closed thereby controlling fluid [110] by increasing the pressure in the seat reservoir section [140] and applying pressure on the needle head [227] dislodging it from the needle seat [245] and applying pressure on the shutoff bell [240] such that the bell can traverse across the pipeline [105]. Once the shutoff bell [240] has moved from being in contact with the seat reservoir section [140], fluid begins to flow from the upper main fluid flow [115] to the lower main fluid flow [116] in the pipeline [105]. The pressure and/or flow sensors (not shown) are returned to their original states wherein they resume sending information to the computer (not shown) for analysis and the activation solenoid valve [201] and bell solenoid valve [215] are closed, thus stopping the flow of fluid [110] thru the input section [120]. The seat reservoir relief shutoff valve [260] then opens allowing the flow of fluid [110] to turn the turbine [255] thereby generating electrical power that can be utilized to power the HCV [100] in the event that the HCV is not fully powered via hydraulic means. The flow of fluid [110] then passes through the seat reservoir section [140], through the seat reservoir relief channel [170] to the output section [125] of the lower portion of the main pipeline [105].

Optionally, if there is a need to nudge the needle base [225] or the needle head [227] to start the dual action piston motion within either the bell reservoir section [130] or the seat reservoir section [140] an optional worm gear device [290] can be employed which pushes the needle using manual, automatic, or remote control [297] via mechanical or electrical means. This device is comprised of a hollow piston shaft [291], a worm gear device [290], manual, automatic, or remote control device [297], and an indented portion [295] to allow for nudging the needle head [227] located in the seat reservoir section [140] and a flat head [296] to allow for nudging the needle base [225] located in the bell reservoir section [130].

Optionally, for FIG. 1A and FIG. 2 a self cleaning screening mechanism [157] which lies in the portholes that provide access entry into the electrical activation channel [150], hydraulic poppet channel [155], and activation channel [160], on either side of the upper main pipeline [105] can be utilized, depending on the cleanliness of the fluid, gas, and/or environmental surroundings.

Figure 3A:
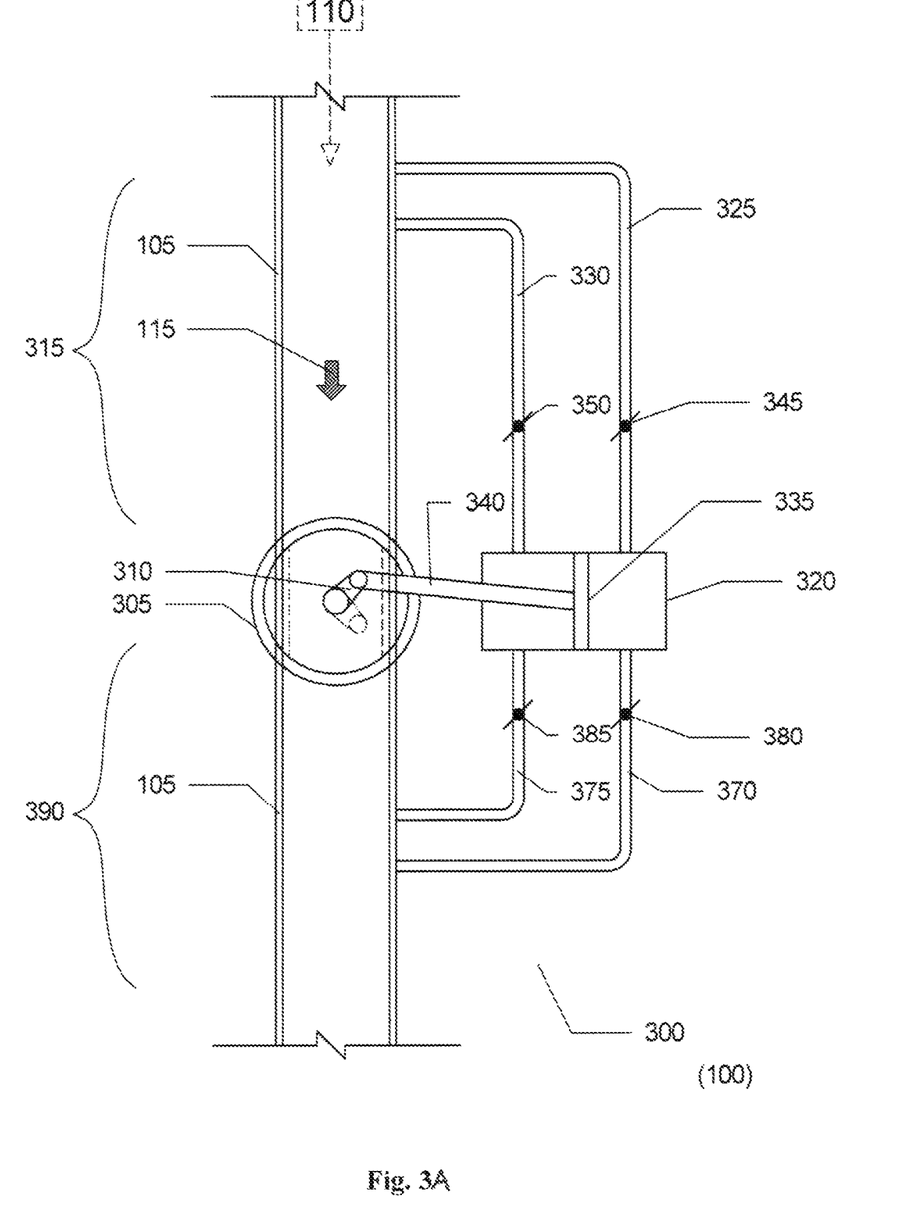
FIG. 3A is a sectional detail of an alternative HCV using a standard ball valve that is actuated and deactuated using a two chambered piston that is with the fluid flow controlled by opening and closing solenoid valves.

FIG. 3A illustrates and describes an HCV [100] that uses a ball valve [305] within a pipeline [105] that is attached to and activated by a piston activated HCV [300]. The ball valve [305] is attached to a lever [310] that rotates the ball valve [305] to open the pipeline [105] or close the pipeline [105] allowing the fluid [110] to flow downstream. The fluid flow [115] in FIG. 3A is from top to bottom however the pipeline [105] may be rotated so the lever [310] is at any horizontal or vertical position. Attached to the inflow section [315] of the pipeline [105] is a piston assembly [320] that is activated by the fluid [110]. Fluid [110] is allowed to enter the piston assembly [320] via an actuator inflow channel [325] or an actuator outflow channel [330] urging a dual-faced piston [335] in a direction so as to move linkage-1 [340] attached to a lever [310] thus moving the ball valve [305]. Downstream of the ball valve [305] is the outflow section [390] which reconnects to the pipeline [105].

Figure 3B:
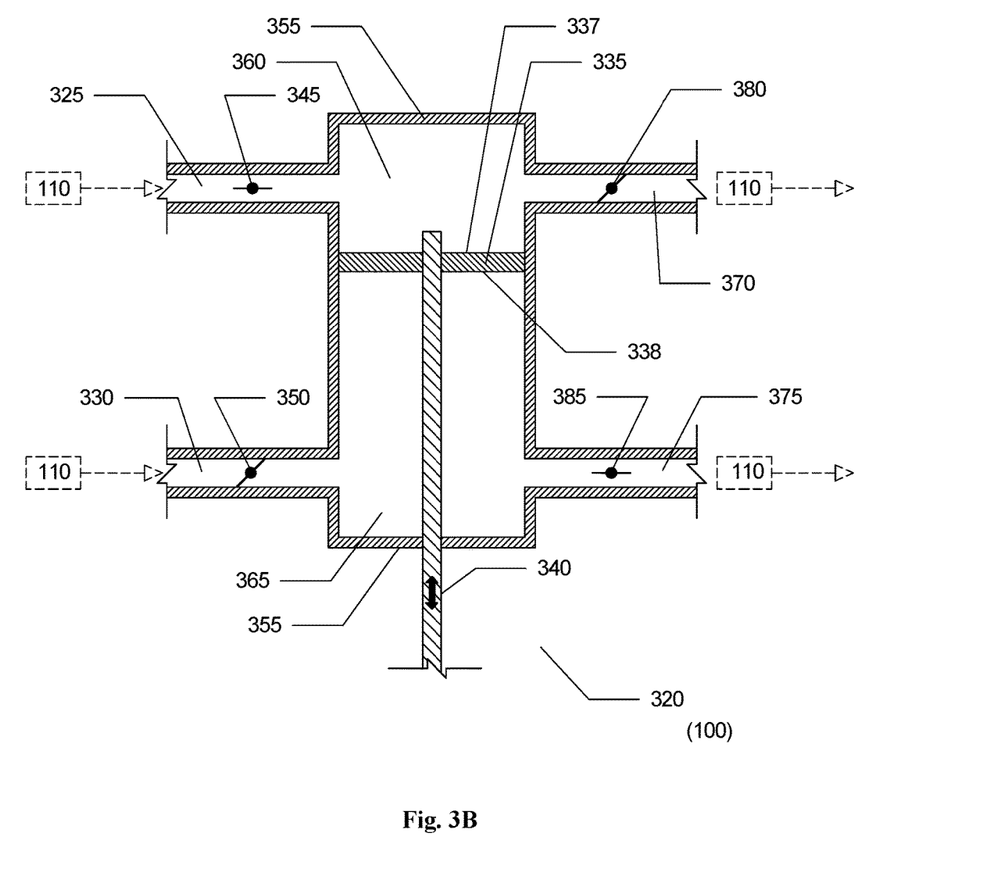
FIG. 3B is a sectional detail of the piston assembly of FIG. 3A.

FIG. 3B is a sectional detail of the piston assembly [320] of the HCV [100] described in FIG. 3A. The piston assembly [320] is in fluid communication with the inflow section [320] (shown in FIG. 3A) of the pipeline [105] (shown in FIG. 3A) via the actuator inflow channel [325] and inflow channel valve [345] and actuator outflow channel [330] and outflow channel valve [350]. The piston assembly [320] houses a dual-faced piston [335] in a fluid chamber [355] wherein the dual-faced piston [335] creates a first fluid chamber [360] and a second fluid chamber [365] that change in volume as the dual-faced piston [335] slides within the fluid chamber [355]. The first fluid chamber [360] and the second fluid chamber [365] are also connected to an inflow relief channel [370] and an outflow relief channel [375] containing an inflow relief valve [380] and an outflow relief valve [385] respectively.

The piston assembly [320] moves in one direction when the inflow channel valve [345] is opened and fluid [110] flows into the actuator inflow channel [325] and into the first fluid chamber [360]. The inflow relief valve [380] is closed thereby capturing the fluid [110] in the first fluid chamber [360]. The outflow channel valve [350] is also closed and the outflow relief valve [385] is opened. In this manner the fluid [110] flows through the actuator inflow channel [325] and into the first chamber [360] and is restricted from flowing any further by the closed inflow relief valve [380]. Pressure builds in the first fluid chamber [360] and against a first face [337] of the dual-faced piston [335] urging the dual-faced piston [335] toward the second fluid chamber [365]. Fluid [110] from the second fluid chamber [365] is urged into the outflow relief channel [375] and past the outflow relief valve [385] and into the outflow section [390] (shown in FIG. 3A) of the pipeline [105] (shown in FIG. 3A). The linkage-1 [340] attached to the dual-faced piston [335] urges the lever [310] (shown in FIG. 3A) of the ball valve [305] (shown in FIG. 3A) in a direction to open or close the ball valve [305] (shown in FIG. 3A) to restrict the pipeline [105] (shown in FIG. 3A) and stop fluid [110] from flowing.

In another operating mode, the inflow channel valve [345] is closed and the inflow relief valve [380] is opened allowing fluid [110] to flow from the first fluid chamber [360] into the inflow relief channel [370] past the open inflow relief valve [380] to the outflow section [390] (shown in FIG. 3A) and into the pipeline [105] (shown in FIG. 3A). The outflow channel valve [350] is opened and the outflow relief valve [385] is closed allowing fluid [110] to flow through the actuator outflow channel [330] and into the second fluid chamber [365]. The fluid [110] exerts a pressure on the second face [338] of the dual-faced piston [335] and urges the dual-faced piston [335] toward the first fluid chamber [360] thus moving the linkage-1 [340]. The linkage-1 [340] is attached to the lever [310] (shown in FIG. 3A) of the ball valve [305] (shown in FIG. 3A) and the movement of the dual-faced piston [335], linkage-1 [340] and the lever [310] (shown in FIG. 3A) opens the ball valve [305] (shown in FIG. 3A) within the pipeline [105] (shown in FIG. 3A) allowing fluid [110] to flow through the pipeline [105] (shown in FIG. 3A).

Figure 4:
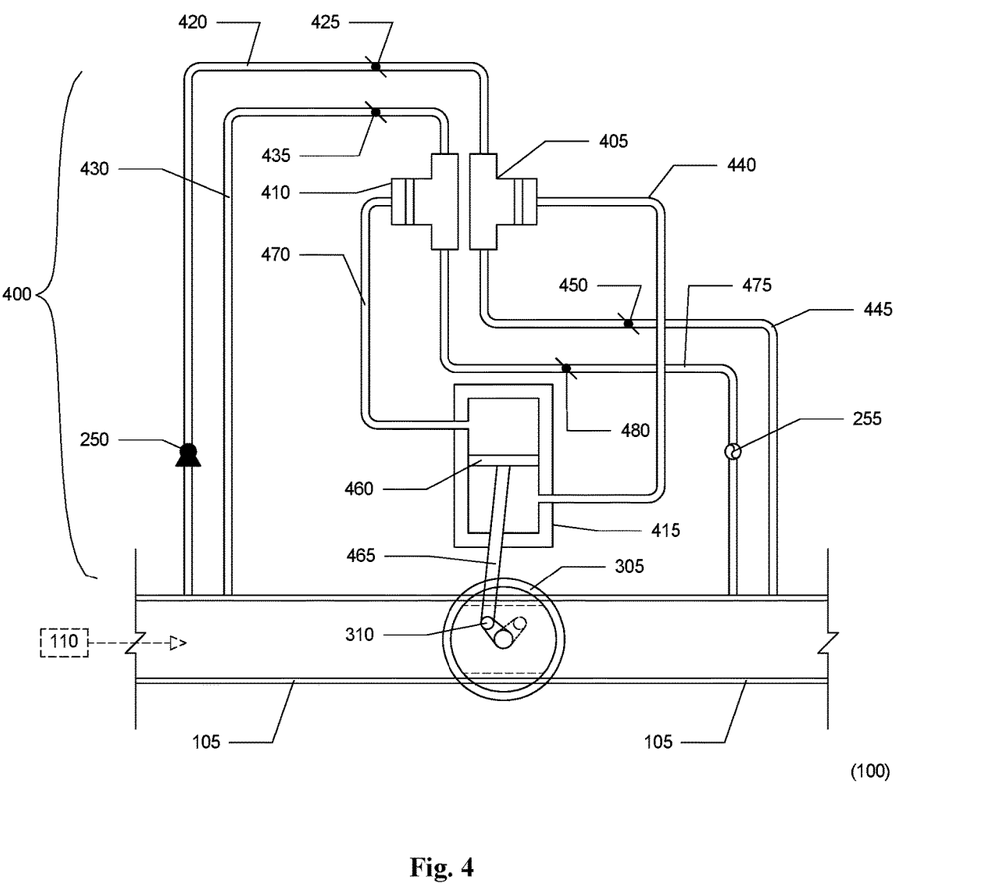
FIG. 4 is a schematic of an HCV using isolator pressure chambers coupled to a piston assembly used to activate and deactivate a standard ball valve assembly.

FIG. 4 is a schematic of an HCV [100] and isolator pressure assembly [400] using a isolator pressure chamber [405] and a reservoir pressure chamber [410] coupled to a piston assembly [415] which is used to activate and deactivate a ball valve [305] within a pipeline [105].

Attached, and in fluid communication with the pipeline [105], is an isolator input channel [420] having an isolator input channel valve [425] and attached to an isolator pressure chamber [405]. Additionally, there is a reservoir input channel [430] having a reservoir input valve [435] and attached to a reservoir pressure chamber [410]. From the isolator pressure chamber [405] is a piston activator channel [440] which is attached to the lower portion of the piston assembly [415] and an isolator relief channel [445] with an isolator relief channel valve [450] wherein the isolator relief channel [445] is attached to the pipeline [105] downstream of the ball valve [305]. The piston activator channel [440] transmits forced hydraulic fluid [455] (shown in FIG. 5) into the piston assembly [415] urging a dual-faced piston [460] which is attached to a linkage-2 [465] in a direction transmitted to the lever [310] of the ball valve [305] thus moving the ball valve [305] to a closed position within the pipeline [105].

Attached to the reservoir pressure chamber [410] is the reservoir piston channel [470] which attaches to the top portion of the piston assembly [415]. The isolator pressure chamber [405], piston activator channel [440], piston assembly [415], reservoir piston channel [470] and reservoir pressure chamber [410] form a closed loop for the forced hydraulic fluid [455] (shown in FIG. 5) keeping the forced hydraulic forced hydraulic fluid [455] (shown in FIG. 5) and media fluid [110] separate from each other. Further details on the operation will be explained in FIG. 5.

A reservoir output channel [475] is attached to, and in fluid communication with, the reservoir pressure chamber [410]. The reservoir output channel [475] also contains the reservoir output channel valve [480] and is attached to the pipeline [105] downstream of the ball valve [305].

Optionally there may be a turbine generator [255] in either the isolator relief channel [445] or the reservoir output channel [475] for generating electricity.

Optionally a hydroelectric pump [250] may be placed within either the isolator input channel [420] or the reservoir input channel [430] to assist the fluid [110] flow into the isolator pressure chamber [405] or the reservoir pressure chamber [410].

Linkage-1 [340], as shown in FIG. 3, and linkage-2 [465], as shown in FIG. 4 may include teeth providing a rack and lever [310] and may also include teeth as a pinion for actuation of the ball valve [305].

Figure 5:
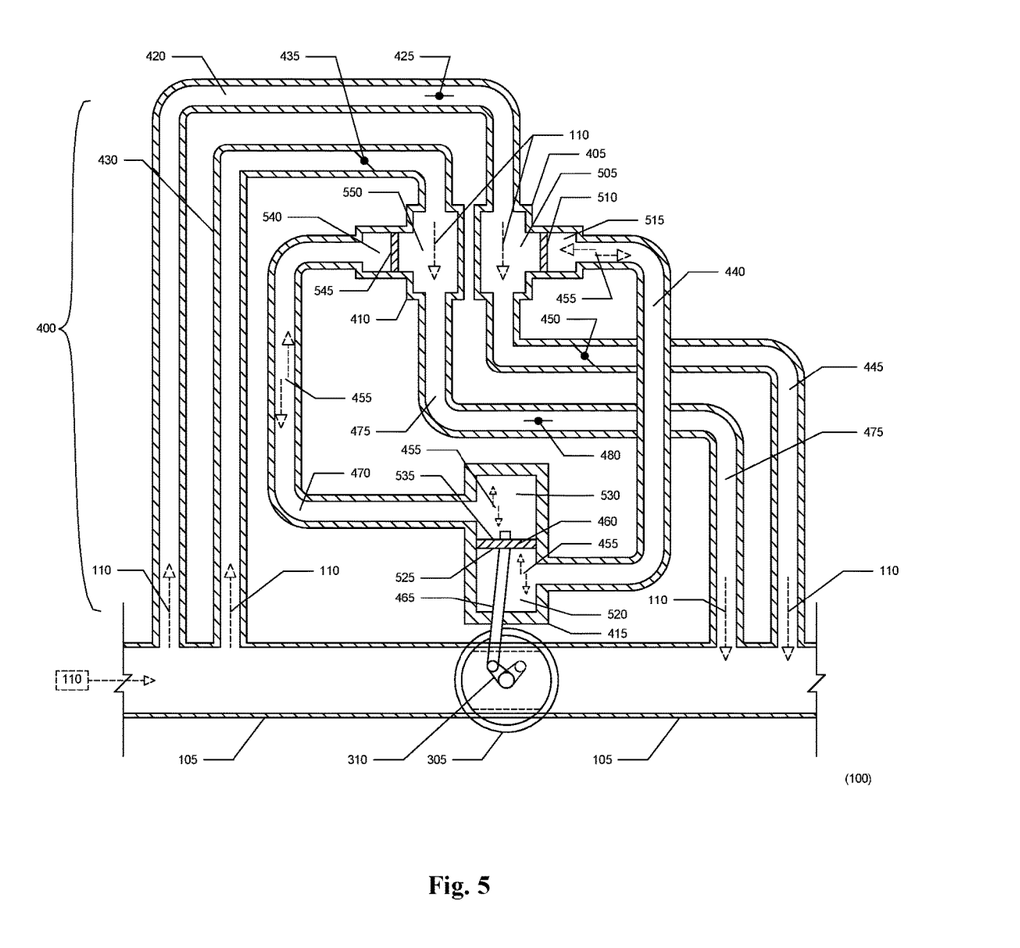
FIG. 5 is a sectional view of the isolator pressure assembly.

FIG. 5 is a sectional view of the isolator pressure assembly [400] used for actuating and de-actuating an HCV [100] within a pipeline [105]. When isolator input channel valve [425] is open, reservoir input channel valve [435] is closed, isolator relief channel valve [450] is closed and reservoir output channel valve [480] is open, fluid [110] is allowed to flow from the pipeline [105] past the open isolator input channel valve [425] and into the isolator pressure chamber [405]. Once the fluid fills the first isolator chamber [505] and isolator relief channel [445] up to the isolator relief channel valve [450] it exerts a pressure on the isolator disk [510] and urges the isolator disk [510] to move toward the second isolator chamber [515]. The second isolator chamber [515] is filled with forced hydraulic fluid [455] which flows from the second isolator chamber [515] into the piston activator channel [440] and into the lower portion of the piston assembly [415]. The forced hydraulic fluid [455] fills the piston second chamber [520] exerting pressure on the secondary piston face [525] urging the dual-faced piston [460] toward the piston primary chamber [530]. Forced hydraulic fluid [455] in the piston primary chamber [530] is then urged by the piston primary face [535] to exit the piston primary chamber [530] into the reservoir piston channel [470] and into the reservoir secondary chamber [540] urging the reservoir disk [545] toward the reservoir primary chamber [550]. As the reservoir disk [545] moves into the reservoir primary chamber [550] fluid [110] in the reservoir primary chamber [550] is urged out the reservoir output channel [475] past the reservoir output channel valve [480] and into the pipeline [105] downstream of the ball valve [305]. In this manner, the fluid [110] and the forced hydraulic fluid [455] are kept separate from each other in a close circuit by the isolator pressure chamber [405] and isolator disk [510] and the reservoir pressure chamber [410] and reservoir disk [545].

As described earlier, when the forced hydraulic fluid [455] fills the piston second chamber [520] exerting pressure on the secondary piston face [525] urging the dual-faced piston [460] toward the piston primary chamber [530], the dual-faced piston [460] moves the linkage-2 [465] connected to lever [310] with thereby closing the ball valve [305] and thus stopping the fluid [110] flow within the pipeline [105].

To open the ball valve [305] in the pipeline [105] the following conditions exist. The isolator input channel valve [425] is closed, the reservoir input channel valve [435] is opened, the reservoir output channel valve [480] is closed and the isolator relief channel valve [450] is opened. Closing the isolator input channel valve [425] restricts fluid [110] from flowing in the isolator input channel [420] while opening the reservoir input channel valve [435] permits fluid [110] to flow into the reservoir pressure chamber [410], more specifically into the reservoir primary chamber [550] up to the closed reservoir output channel valve [480] where the fluid [110] then fills the reservoir primary chamber [550] exerting a force on the reservoir disk [545] and urging it into the reservoir secondary chamber [540]. As the reservoir disk [545] moves into the reservoir secondary chamber [540] the forced hydraulic fluid [455] in the reservoir secondary chamber [540] is pushed out into the reservoir piston channel [470] and into the piston primary chamber [530]. The pressure of the forced hydraulic fluid [455] on the piston primary face [535] urges the dual-faced piston [460] to move into the piston second chamber [520] thereby moving the linkage-2 [465] to move the lever [310] and ball valve [305] to an open position within the pipeline [105].

The forced hydraulic fluid [455] in the piston second chamber [520] flows out through the piston activator channel [440], into the second isolator chamber [515] creating a pressure on the isolator disk [510] urging the isolator disk [510] to move into the first isolator chamber [505] thereby displacing the fluid [110] out through the isolator relief channel [445], past the isolator relief channel valve [450] and into the pipeline [105] downstream of the ball valve [305]. Valves [425, 435, 450, and 480] may be manipulated by an operator or computer in a sequence to urge the dual-faced piston [460] in either direction, thereby preventing the flow of fluid [110] in the pipeline [105].

Figure 6:
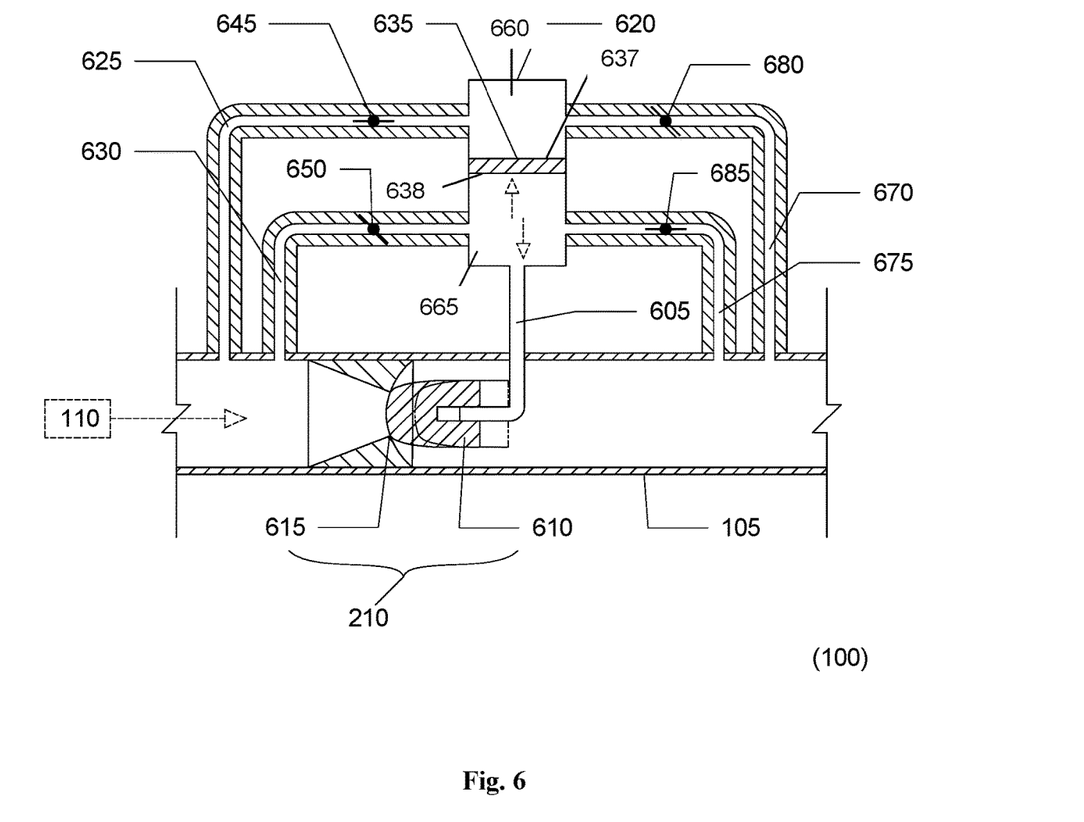
FIG. 6 is a schematic with a flow throttling device (FTD) in a pipeline that is controllable and used as an HCV.

FIG. 6 describes a flow throttling device (FTD) [210] linearly placed within a pipeline [105] that is externally controllable by a computer (not shown) or operator (not shown) and used as an HCV [100] in a pipeline [105]. A piston assembly [620] that is similar to the one described in FIG. 3 is used to create a hydraulic pressure within a piston assembly [620]. Fluid [110] is allowed to enter the piston assembly [620] via an actuator inflow channel [625] or an actuator outflow channel [630] urging a dual-faced piston [635] in a direction so as to move fluid into an activation channel [605]. The piston assembly [620] moves in a downward direction when the inflow channel valve [645] is opened and fluid [110] flows into the actuator inflow channel [625] and into the first fluid chamber [660]. The inflow relief valve [680] is closed thereby capturing the fluid [110] in the first fluid chamber [660]. The outflow channel valve [650] and the outflow relief valve [685] are also closed. In this manner the fluid [110] flows through the actuator inflow channel [625] and into the first chamber [660] and is restricted from flowing any further due to the closed inflow relief valve [680]. Hydraulic pressure builds in the first fluid chamber [660] and against a first face [637] of the dual-faced piston [635] urging the dual-faced piston [635] toward the second fluid chamber [665]. The hydraulic pressure pushes the fluid [110] from the second fluid chamber [665], such that the fluid exits the piston assembly [620] and subsequently enters an activation channel [605] which is in fluid communication with an FTD bell [610]. The hydraulic pressure moves the FTD bell [610] into contact with an FTD bell seat [615] thus sealing the FTD [210] preventing fluid [110] to flow within a pipeline [105].

Inversely, hydraulic pressure is relieved from the activation channel [605] thereby allowing the FTD bell [610] to move off the FTD bell seat [615] permitting fluid [110] to flow within the pipeline [105]. The inflow channel valve [645] is closed and the inflow relief valve [680] is opened allowing fluid [110] to flow from the first fluid chamber [660] into the inflow relief channel [670], past the open inflow relief valve [680] to the bottom of the pipeline [105] downstream from the FTD bell [610]. The outflow channel valve [650] and the outflow relief valve [685] remain in the open and closed position (respectively) allowing fluid [110] to flow through the actuator outflow channel [630] and into the second fluid chamber [665]. The fluid [110] exerts hydraulic pressure on the second face [638] of the dual-faced piston [635] and urges the dual-faced piston [635] toward the first fluid chamber [660] thus relieving the pressure in the activation channel [605] thereby allowing the FTD bell [610] to move off the FTD bell seat [615] permitting fluid [110] to flow within the pipeline [105]. In this configuration only electrical activation occurs when using the piston assembly shown for which a dual-faced piston [635] is required.

The invention claimed is:

1. A hydroelectric control valve (HCV) for a fluid pipeline comprising;
   four pipe sections forming a cross-like pattern with an inlet and outlet section attached to a pipeline wherein fluid flows into and out of said HCV;
   a bell reservoir section and a seat reservoir section that are both capped, wherein said bell reservoir section and said seat reservoir section are in line with each other and are also perpendicular to fluid flow through said pipeline;
   wherein within an input section, an electrical activation channel is attached to said bell reservoir section, such that said bell reservoir section includes both a bell relief channel in fluid communication with said outlet section and also a separate hydraulic poppet channel; the input section further including a deactivation channel for a turbine together with a locating needle head and said deactivation channel connects said input section and said seat reservoir section;
   wherein said seat reservoir section includes a seat reservoir relief channel also in fluid communication with said output section;
   wherein within said electrical activation channel or a main flow channel is a pressure sensor and/or a flow sensor that monitors pressure and/or flow creating a datastream of said fluid within said pipeline;
   and wherein hydroelectric poppet flow within said hydraulic poppet channel is not assisted by the addition of an inline pump and wherein maximum movement of a locating needle head urges a bell to laterally move across said pipeline thereby controlling flow of fluids through said pipeline and wherein a self-cleaning screening mechanism lies in a porthole allowing for access to entry into one or more said electrical activation channel, said hydraulic poppet channel, and/or the activation channel.

* * * * *